United States Patent
Eriksson et al.

(10) Patent No.: US 7,164,890 B2
(45) Date of Patent: Jan. 16, 2007

(54) LINK ADAPTATION FOR POINT-TO-MULTIPOINT CHANNEL

(75) Inventors: Stefan Eriksson, Stockholm (SE); Hannes Ekstroem, Aachen (DE); Andreas Schieder, Herzogenrath (DE); Henning Wiemann, Aachen (DE)

(73) Assignee: Telefonaktiebologet LM Ericsson (publ), Stockholm (SE)

( * ) Notice: Subject to any disclaimer, the term of this patent is extended or adjusted under 35 U.S.C. 154(b) by 328 days.

(21) Appl. No.: 10/717,918

(22) Filed: Nov. 21, 2003

(65) Prior Publication Data

US 2005/0113099 A1 May 26, 2005

(51) Int. Cl.
H04B 1/00 (2006.01)

(52) U.S. Cl. .............. 455/69; 455/450; 455/522; 370/330; 370/329; 709/201

(58) Field of Classification Search ............... 455/69, 455/63.1, 63.2, 67 A, 450, 522; 370/330, 370/328, 329, 229; 709/200, 201
See application file for complete search history.

(56) References Cited

U.S. PATENT DOCUMENTS

| | | | |
|---|---|---|---|
| 6,614,772 B1* | 9/2003 | Sexton et al. | 370/335 |
| 6,956,839 B1* | 10/2005 | Sexton et al. | 370/335 |
| 2003/0036359 A1* | 2/2003 | Dent et al. | 455/63 |
| 2003/0043778 A1* | 3/2003 | Luschi et al. | 370/349 |
| 2003/0081626 A1 | 5/2003 | Naor et al. | |
| 2003/0103454 A1* | 6/2003 | Wahl et al. | 370/229 |
| 2003/0134655 A1 | 7/2003 | Chen et al. | |
| 2003/0207696 A1 | 11/2003 | Willenegger et al. | |
| 2003/0235147 A1* | 12/2003 | Walton et al. | 370/204 |
| 2004/0120280 A1* | 6/2004 | Western | 370/328 |
| 2004/0184398 A1* | 9/2004 | Walton et al. | 370/203 |
| 2004/0210619 A1* | 10/2004 | Balachandran et al. | 709/200 |
| 2004/0229572 A1* | 11/2004 | Cai et al. | 455/69 |
| 2005/0047515 A1* | 3/2005 | Walton et al. | 375/267 |

FOREIGN PATENT DOCUMENTS

| | | |
|---|---|---|
| WO | 01/047314 A2 | 6/2001 |
| WO | 02/017668 A1 | 2/2002 |
| WO | 03/094554 A1 | 11/2003 |

* cited by examiner

*Primary Examiner*—Danh Cong Le
(74) *Attorney, Agent, or Firm*—Nixon & Vanderhye P.C.

(57) ABSTRACT

A network node (28) of a wireless telecommunication network (20) uses a first coding scheme (selected from plural possible coding schemes) for encoding of a point-to-multipoint (PTM) transmission carried to plural mobile stations (30) on a common downlink channel (32). The mobile stations (30) receiving the point-to-multipoint transmission on the common downlink channel (32) evaluate the link quality of the point-to-multipoint transmission. Feedback from the plural mobile stations (30) regarding the link quality of the point-to-multipoint transmission is provided to the network node (28) on a common uplink channel (36). A controller (48) at the network node (28) monitors information received on the common uplink channel for feedback regarding the link quality of the point-to-multipoint transmission. The controller (48) at the network node (28) uses the feedback to determine whether to change from the first coding scheme to a second coding scheme for the encoding of the point-to-multipoint transmission to the plural mobile stations (30).

28 Claims, 9 Drawing Sheets

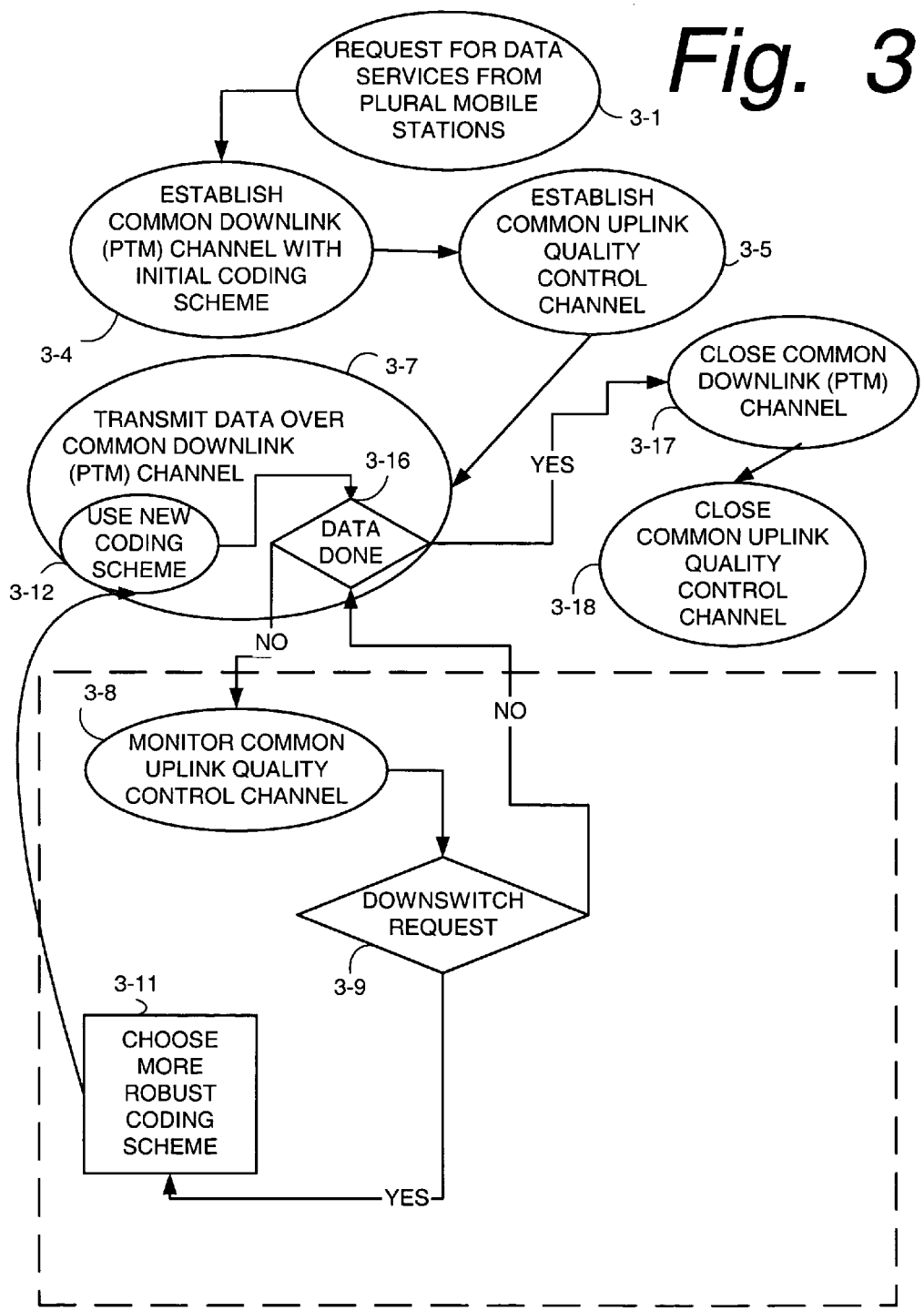

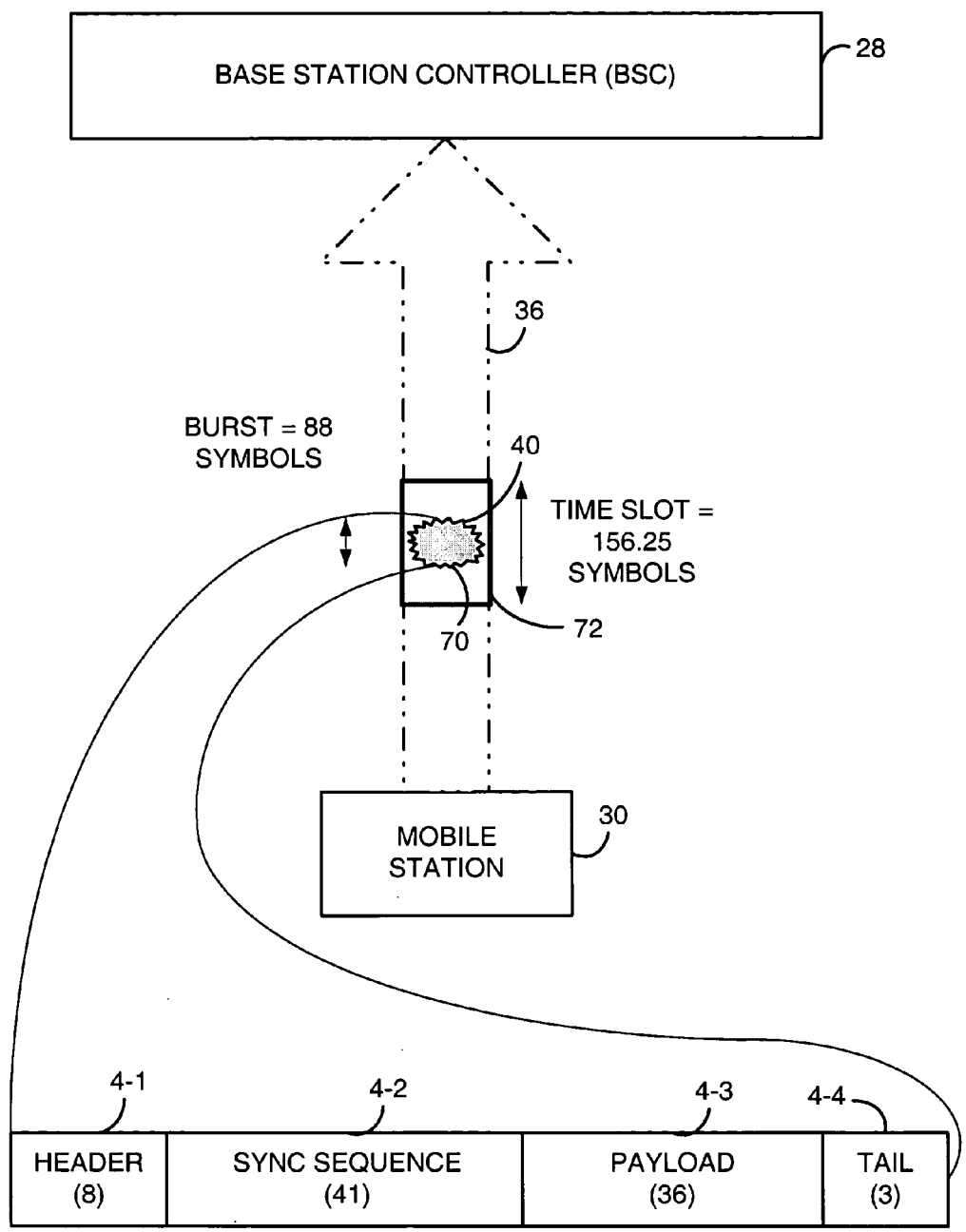

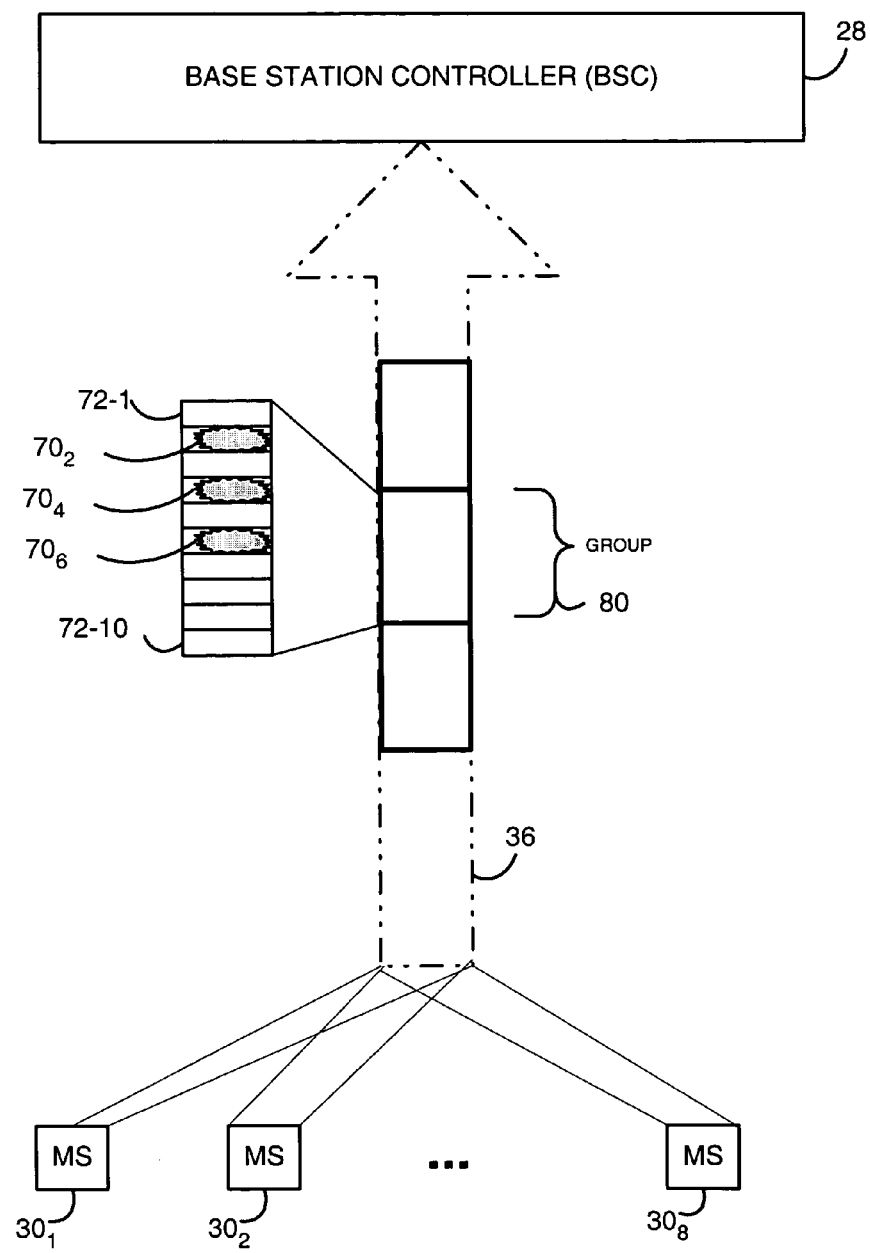

LINK ADAPTATION FOR POINT-TO-MULTIPOINT CHANNEL

BACKGROUND

1. Field of the Invention

The present invention pertains to wireless telecommunications, and particularly to point-to-multipoint transmissions in a wireless telecommunications network.

2. Related Art and Other Considerations

In a typical cellular radio system, wireless terminals, often called mobile stations or user equipment units (UEs), communicate via a radio access network to one or more core networks. The wireless terminals can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the mobile stations within range of the base stations. In the radio access network, several base stations are typically connected (e.g., by landlines or microwave) to a base station controller (BCS) node, sometimes termed a radio network controller (RNC). The base station controller supervises and coordinates various activities of the plural base stations connected thereto. The base station controllers are typically connected to one or more core networks.

One example of a radio access network is the Global System for Mobile communications (GSM) developed in Europe. Other types of telecommunications systems which encompass radio access networks include the following: Advance Mobile Phone Service (AMPS) system; the Narrowband AMPS system (NAMPS); the Total Access Communications System (TACS); the Personal Digital Cellular (PDS) system; the United States Digital Cellular (USDC) system; the wideband code division multiple access (WCDMA) system; and the code division multiple access (CDMA) system described in EIA/TIA IS-95.

In GSM systems the robustness of the radio signal is influenced by two factors: the modulation and coding scheme (MCS) and the transmit power. Higher transmit power makes the radio signal more error resilient but generates interference in the system, thereby disturbing other radio links. Furthermore, the available transmit power per base station is limited. Different Modulation and Coding Schemes use different code rates to protect the user data. MCSs with little parity provide high data rates but low robustness and are therefore chosen in case of good radio conditions. However, if the radio conditions are poor an MCS using stronger coding must be used at the cost of lower data rates seen by higher layers.

In a point-to-multipoint transmission mode, data (e.g., a video clip) is transmitted to several mobile stations on a common downlink channel (a so-called point-to-multipoint channel). Depending on the positions of the mobile stations in the cell and their respective radio conditions, each of the mobile stations will likely experience different link quality for the common downlink channel involved in the point-to-multipoint transmission. If the network is unaware of the position and conditions of the mobile stations, the coding scheme utilized for the point-to-multipoint transmission on the common downlink channel must be preconfigured to cope with a worst case link condition that could occur in that particular radio cell. This would guarantee sufficient quality for all mobile stations independent of their position in the cell. Unfortunately, also the mobiles with good radio link quality suffer from the decreased data rate provided on the point-to-multipoint channel. And even if all active mobiles in the cell experience good radio quality, radio resources are wasted by transmitting unnecessary parity information.

To increase the bit rate (depending on the actual radio conditions of all active receivers), the mobile stations could separately send information over individual feedback channels to apprise the network of their perception of the link quality of point-to-multipoint transmission over the common downlink channel. The network could then adapt the coding scheme to the actual link quality of the worst mobile station. Unfortunately, having individual feedback channels for each mobile station is impractical, especially if there are many mobile stations receiving the same data in a point-to-multipoint transmission.

What is needed, therefore, and an object of the present invention, is a technique for efficiently adapting the coding scheme for a common downlink channel carrying a point-to-multipoint transmission.

BRIEF SUMMARY

A network node of a wireless telecommunication network uses a first coding scheme (selected from plural possible coding schemes) for encoding of a point-to-multipoint (PTM) transmission carried to plural mobile stations on a common downlink channel. The mobile stations receiving the point-to-multipoint transmission on the common downlink channel evaluate the link quality of the point-to-multipoint transmission. Feedback from the plural mobile stations regarding the link quality of the point-to-multipoint transmission is provided to the network node on a common uplink channel. A controller at the network node monitors information received on the common uplink channel for feedback regarding the link quality of the point-to-multipoint transmission. The controller at the network node uses the feedback to determine whether to change from the first coding scheme to a second coding scheme for the encoding of the point-to-multipoint transmission to the plural mobile stations.

If a mobile station (such as a mobile station at a cell border) determines the link quality of the point-to-multipoint transmission to be poor, such complaining mobile station sends a signal (e.g., burst) on the common uplink channel. Upon detecting the signal indicative of a complaint on the common uplink channel, in one mode of operation the controller of the network node chooses a more robust coding scheme as the second coding scheme for the encoding of the point-to-multipoint transmission to the plural mobile stations.

In another mode of operation, when the feedback received on the common uplink channel fails to provide any complaint regarding link quality within a predetermined time interval, the controller of the network node changes the encoding of the point-to-multipoint transmission from the first coding scheme to the second coding scheme (in this case the second coding scheme being a less robust coding scheme than the first coding scheme).

In yet another mode of operation, the controller of the network node changes the encoding from the first coding scheme to the second (more robust) coding scheme only when the feedback includes an indication that a sufficient number of the mobile stations are complaining regarding link quality. As one example technique of implementing this mode, a specified number of plural time slots received on the common uplink channel are formed or associated together into a reporting group. When a mobile station determines that it needs to complain about link quality of the point-to-multipoint transmission, a signal indicative of the complaint is made in one of the plural time slots forming the reporting group. Preferably, the particular time slot in which the mobile station is permitted to send the signal indicative of the complaint is randomly determined.

The controller of the network node then obtains an estimate of a number of the mobile stations that are complaining regarding link quality by ascertaining how many of the plural time slots in the reporting group include a signal indicative of a complaint. The controller of the network node compares the estimate to a predetermined trigger value, and changes the encoding of the point-to-multipoint transmission from the first coding scheme to the second coding scheme when the estimate equals or exceeds the predetermined trigger value (the second coding scheme being a more robust coding scheme than the first coding scheme).

In one mode of operation, the common uplink channel is a random access channel, and preferably a PRACH channel.

The mobile station is configured to operate in a wireless telecommunication network, and comprises a receiver which receives from a network node the encoded point-to-multipoint transmission carried on a common downlink channel. A controller of the mobile station monitors link quality of the point-to-multipoint transmission and causes provision of the feedback regarding the link quality of the point-to-multipoint transmission on the common uplink channel to a network node.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3, FIG. 3A, FIG. 3B, FIG. 3C, and FIG. 3D are flowcharts illustrating basic example steps involved in differing modes of a link quality monitoring procedure for a point-to-multipoint transmission.

FIG. 4 is a diagrammatic view of a common uplink channel for illustrating transmission of a feedback signal indicative of a complaint sent from a mobile station to a network node.

FIG. 5 is a diagrammatic view of a common uplink channel for illustrating transmission of a reporting group sent from mobile stations to a network node.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
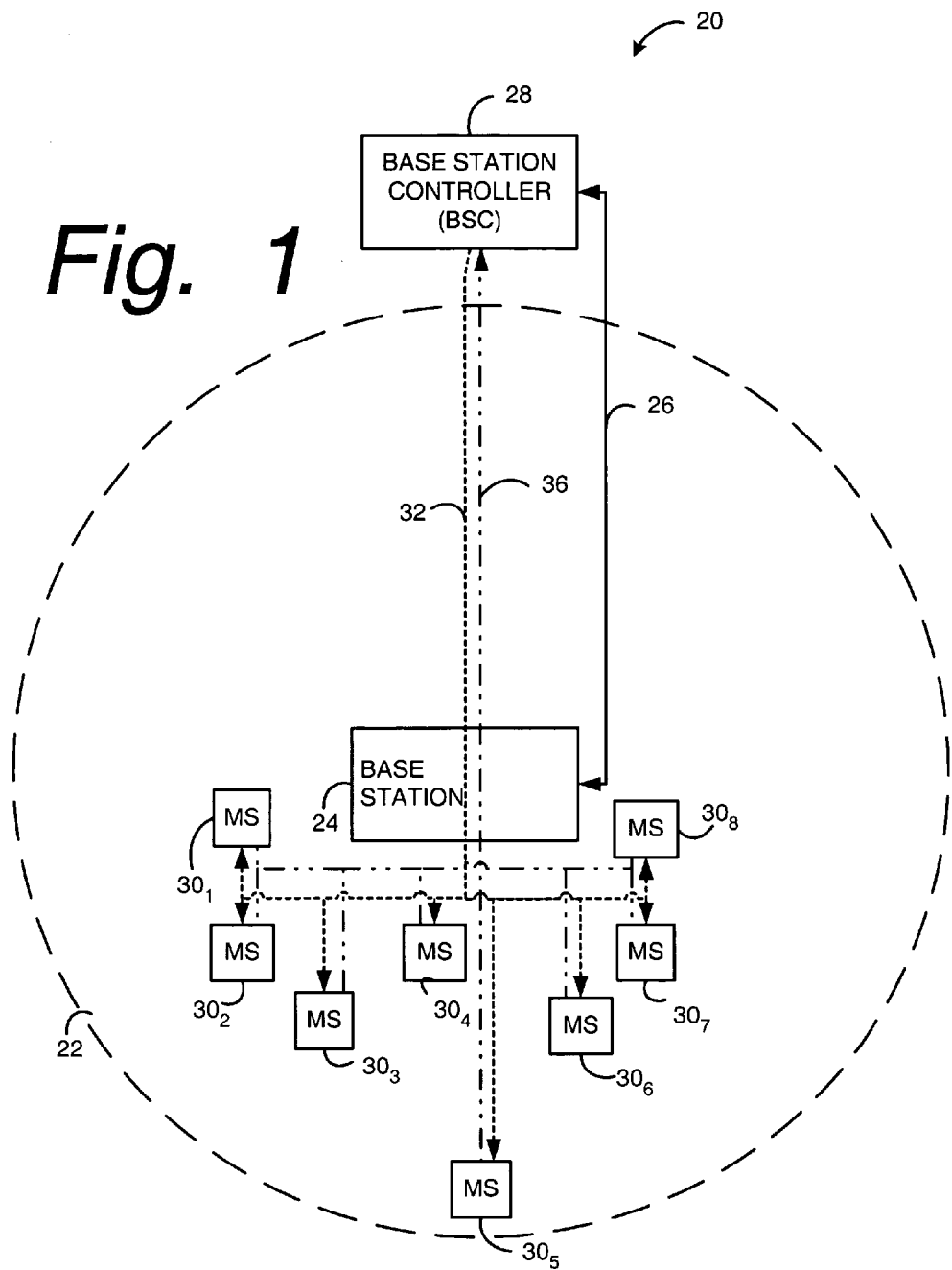
FIG. 1 is diagrammatic view of example portions of a mobile communications system involved in a point-to-multipoint transmission.

FIG. 1 shows example portions of a mobile communications system 20 which are useful for illustrating concepts involved in a link quality monitoring procedure for a point-to-multipoint transmission. FIG. 1 specifically shows a cell 22 which is served by a base station (BS) 24. The base station (BS) 24 is connected by a physical link 26 (e.g., a landline or microwave link) to a base station controller (BSC) 28. It will be appreciated that base station controller (BSC) 28 may be connected to many other unillustrated base stations, as well as to other (unillustrated) base station controllers and to core network nodes.

FIG. 1 further depicts that a point-to-multipoint transmission is occurring from base station controller (BSC) 28 to plural mobile stations 30 in cell 22. The point-to-multipoint transmission occurs on a common downlink channel 32 (illustrated by a dotted line in FIG. 1), and is encoded at base station controller (BSC) 28 with one of plural possible coding schemes. The common downlink channel 32 is depicted in FIG. 1 as extending from base station controller (BSC) 28 to plural mobile stations $30_1$ through $30_8$. The common downlink channel 32 is physically carried over physical link 26 from base station controller (BSC) 28 to base station (BS) 24, and over the air (e.g., radio frequency) interface from base station (BS) 24 to the plural mobile stations $30_1$ through $30_8$.

In the particular mobile communications system 20 shown in FIG. 1, encoding of the point-to-multipoint transmission occurs at base station controller (BSC) 28. In another type of radio access network, it is possible that encoding of the point-to-multipoint transmission may occur at another type of network node, or a node having another appellation. Accordingly, it should be understood that the base station controller (BSC) 28 is just one example, representative type of network node which can be involved in the point-to-multipoint transmission.

The number (eight) of mobile stations 30 involved in the particular point-to-multipoint transmission depicted in FIG. 1 is merely an illustrative example. The number of mobile stations involved in any particular point-to-multipoint transmission can be a greater or lesser number. Moreover, the types of equipment comprising the mobile stations can vary from terminal to terminal, provided that the mobile stations are otherwise configured to operate in accordance with the link quality monitoring procedure for a point-to-multipoint transmission as generally described herein.

The plural mobile stations $30_1$ through $30_8$ receiving the point-to-multipoint transmission on the common downlink channel each evaluate the link quality of the 1o point-to-multipoint transmission. Feedback from the plural mobile stations $30_1$ through $30_8$ regarding the link quality of the point-to-multipoint transmission is provided to the network node on a common uplink channel 36. Even though all mobile stations could send uplink feedback on common uplink channel 36, it is more likely that only one (or a few) mobiles do actually send a signal at any given time. The common uplink channel 36 is shown in FIG. 1 as a dashed double dotted line originating from each of the mobile stations 30 and terminating at the base station controller (BSC) 28. In the same manner as the common downlink channel 32, the common uplink channel 36 is physically carried over the air interface from the mobile stations 30 to base station (BS) 24, and over physical link 26 from base station (BS) 24 to base station controller (BSC) 28.

In a manner such as the example manner hereinafter explained, the network node (base station controller (BSC) 28 in the example of FIG. 1) monitors information received on the common uplink channel 36 for feedback regarding the link quality of the point-to-multipoint transmission. The network node 28 uses the feedback to determine whether to change from a current coding scheme (e.g., a first coding scheme) to another (e.g., a second coding scheme) for the encoding of the point-to-multipoint transmission to the plural mobile stations 30.

If a mobile station (such as a mobile station $30_5$ at or near a border of cell 22) determines the link quality of the point-to-multipoint transmission to be poor, as shown in FIG. 4 such complaining mobile station sends a signal (e.g., burst 40) on the common uplink channel 36. Upon detecting the signal indicative of a complaint on the common uplink channel 36, in one mode of operation the network node 28 chooses a more robust coding scheme as the second coding scheme for the encoding of the point-to-multipoint transmission to the plural mobile stations 30.

Figure 2:
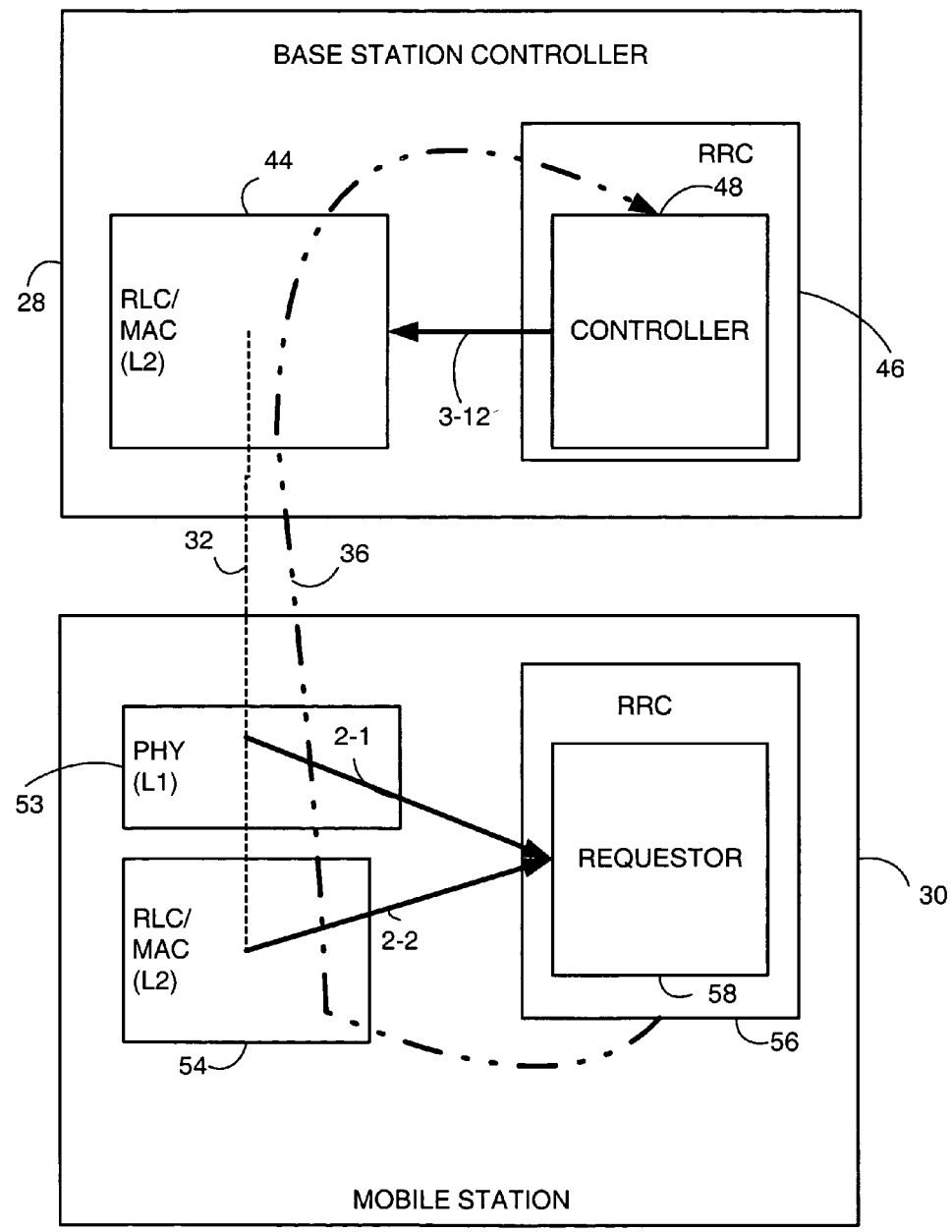
FIG. 2 is a simplified function block diagram of a portion of a mobile station and a base station controller which are involved in the point-to-multipoint transmission.

FIG. 2 shows both a relevant portion of an example mobile station 30 and a base station controller 28 which are involved in a point-to-multipoint transmission over common downlink channel 32. The base station controller (BSC) 28 includes a radio link control (RLC)/medium access control (MAC) functional unit 44 which operates in layer 2 of the International Standards Organization (OSI) Open Systems Interconnection Reference model. Furthermore, it includes radio resource control (RRC) entity 46, which further includes a Multimedia Broadcast & Multicast Service (MBMS)/Link Quality Control (MBMS/LQC) controller 48. The network also has an unillustrated physical layer which resides, e.g., in a base station (not depicted).

The mobile station 30 comprises a receiver which also includes physical layer (layer 1) entity 53, as well as a radio link control (RLC)/medium access control (MAC) functional unit 54 (RLC and MAC are sublayers of layer 2). Furthermore, mobile station 30 includes radio resource control entity 56, which further includes a Multimedia Broadcast & Multicast Service (MBMS)/Link Quality Control (MBMS/LQC) requestor 58.

FIG. 3 is a flowchart illustrating basic example steps involved in one mode of a link quality monitoring procedure for a point-to-multipoint transmission. Steps framed by the broken line in FIG. 3 and ensuing figures are those which primarily involve handling of the common uplink quality control channel. Step 3-1 depicts receipt of a request for data services to be provided to plural mobile stations 30. Upon receipt of the request of step 3-1, as step 3-4 the controller 48 establishes the common downlink channel 32 with an initial coding scheme. The initial coding scheme is one of plural available coding schemes. The initial coding scheme can be set as a system parameter. Alternatively, the initial coding scheme can be pre-defined as a parameter on a cell basis (e.g., a pre-defined, per-cell parameter). As another alternative, the network node can perform an algorithm that sets the initial coding scheme to an optimal value based on previous feedback (over the course of a long time period, e.g., weeks or months).

In addition to establishing the common downlink channel (step 3-4), as step 3-5 the network node establishes the common uplink channel 36. The common uplink channel 36 is also known as the quality control channel. In one example implementation the common uplink channel 36 is preferably a random access channel, such as a Packet Random Access Channel (PRACH).

After establishing both the common downlink channel 32 and the common uplink channel 36, a process 3-7 of transmitting data over the common downlink channel 32 for the point-to-multipoint transmission to the mobile stations 30 is initiated by radio resource control (RRC) entity 46 and performed by radio link control (RLC)/medium access control (MAC) functional unit 44. While the process 3-7 of transmitting data over the common downlink channel 32 is performed, a monitoring process depicted by step 3-8 is also performed by radio link control (RLC)/medium access control (MAC) functional unit 44. The process of step 3-8 is a process of monitoring the common uplink quality control channel (i.e., common uplink channel 36) to determine if the common uplink channel 36 contains a downswitch request, i.e., any signal (e.g., a burst) which indicates that a mobile station is complaining about link quality on the common downlink channel 32.

A complaint about link quality on the common downlink channel 32 may arise from a mobile station which is far from the base station 24 and thus near a cell border, such as mobile station 305 in FIG. 1. If it turns out that common uplink channel 36 does contain a downswitch request or similar complaint (determined at step 3-9), the downswitch request is referred to controller 48. Upon receipt of a downswitch request, as indicated by step 3-11 the controller 48 chooses a more robust coding scheme for the point-to-multipoint transmission being carried on common downlink channel 32. Then, as shown by step 3-12 (see also FIG. 2), the network node controller 48 directs the radio link control (RLC)/medium access control (MAC) functional unit 44 to start to use the new (more robust) coding scheme for the transmit process (depicted by step 3-7). The channel coding is actually performed by the physical layer (which is in the base station), but the RLC/MAC, when told to use the new coding scheme, requests encoding with the new coding scheme from the physical layer. The new, more robust coding scheme for common downlink channel 32 is thus thereafter utilized for all mobile stations 30 participating in the point-to-multipoint transmission.

If the process 3-8 of monitoring the common uplink channel 36 does not encounter a downswitch request (step 3-9), the monitoring process (step 3-8) continues until all data for the point-to-multipoint transmission is completed (step 3-16). When all data included in the point-to-multipoint transmission has been transmitted, both the common downlink channel 32 is closed (step 3-17) and the common uplink channel 36 is closed (step 3-18).

A downswitch request or similar complaint is originated by a mobile station 30 and carried on common uplink channel 36 when the mobile station 30 determines that the link quality of the point-to-multipoint transmission as carried on common downlink channel 32 is poor. A determination of the common downlink channel 32 being a poor quality link can be based on, e.g., the number of bit errors and/or the number of block errors. The number of bit errors and/or the number of block errors can be detected or determined by either physical layer (layer 1) entity 53 or radio link control (RLC)/medium access control (MAC) functional unit 54, which provide a measurement report (as indicated by arrows 2-1 and 2-2, respectively) to radio resource control entity 56, and particularly to RRC requestor 58. The measurement report can be, for example, a MBMS LQC measurement report. Upon receipt of the measurement report, requestor 58 of the mobile station may cause the downswitch request or similar complaint to be carried on common uplink channel 36 to network node 28, depending on the contents of the measurement report. The requestor 58 may process the measurement reports received from the physical layer or RLC/MAC prior to deciding whether to send a downswitch request. This processing may involve averaging over time, filtering, comparing bit error rate or block error rate with a predetermined or fixed threshold etc. There may even be a threshold configured that has to be exceeded before sending the downswitch or complaint to network node 28.

As indicated above, the common uplink channel 36 can be any common uplink channel, such as a random access known as PRACH. The downswitch request can be any signal recognized as a complaint regarding quality of the common downlink channel 32 which carries the point-to-multipoint transmission. For example, a Temporary Block Flow (TBF) can be setup to send a downswitch request control message from the complaining mobile station 30 to the radio resource control entity 46 in network node 28. A Temporary Block Flow (TBF) is a logical connection between two RLC/MAC entities, with the MAC in the network node 28 using the Temporary Block Flow (TBF) to schedule uplink and downlink resources. Alternatively, and as illustrated by FIG. 4, as another one example implementation the downswitch request may take the form of a "burst", such as a random access burst 70. The downswitch request utilizes a fixed or predetermined number of bits per random access burst, with a unique bit pattern which identifies the burst as a downswitch request burst (to distinguish from other types of bursts or signals).

In general, random access (RA) bursts are used to send information on a channel with a time slot structure when the timing of the slot boundaries is not exactly known to the mobile station (MS). To avoid the sent burst overlapping a slot boundary, the RA burst has to be significantly shorter than the slot. For the downswitch request burst 70 here described, the timing of the slot boundaries is roughly known by the mobile station 30 since it receives bursts transmitted in the downlink on common downlink channel 32 (which has the same timeslot structure). The exact timing is not known since the distance between the network node 28 and the mobile station 30, and hence the propagation delay, is unknown.

FIG. 4 illustrates a GSM-type time slot structure for common uplink channel 36, with each time slot 72 being 156.25 symbols long. In one example implementation, the burst 70 is 88 symbols in length, and has the example format shown in FIG. 4. In particular, the example burst 70 of FIG. 4 comprises an eight bit header 4-1; a field of forty one synchronization sequence bits 4-2; a payload field 4-3 of thirty six bits; and, a trailer or tail field 4-4 of three bits. In this example, the payload field 4-3 includes eight information bits plus channel coding (the channel coding being used to enable recovery of the eight information bits should some of the bits of the payload field be corrupted).

A downswitch request burst such as burst 70 of FIG. 4 need not really carry any information at all, and does not necessarily bear any identification of the mobile station which sent the downswitch request burst. The mere fact that a downswitch request burst is received by the network node 28 provides the network node 28 with what it needs to know: that a mobile station participating in the point-to-multipoint transmission was unhappy or unsatisfied with link quality.

In the simplified mode of FIG. 3, lack of any complaint or downswitch request does not have any appreciable effect on the coding scheme. Another mode of operation of the link quality monitoring procedure is illustrated in FIG. 3A. In the FIG. 3A mode, when the feedback received on the common uplink channel 36 fails to provide any complaint regarding link quality within a predetermined time interval, the network node changes the encoding of the point-to-multipoint transmission from the first coding scheme to the second coding scheme (in this mode the second coding scheme is a less robust coding scheme than the first coding scheme). Thus, on the basis of lack of complaints from the mobile stations, the mode of FIG. 3A attempts to increase bit rate and thus efficiency to the extent possible until a complaint, or a sufficient number of complaints, are received.

Figure 3A:
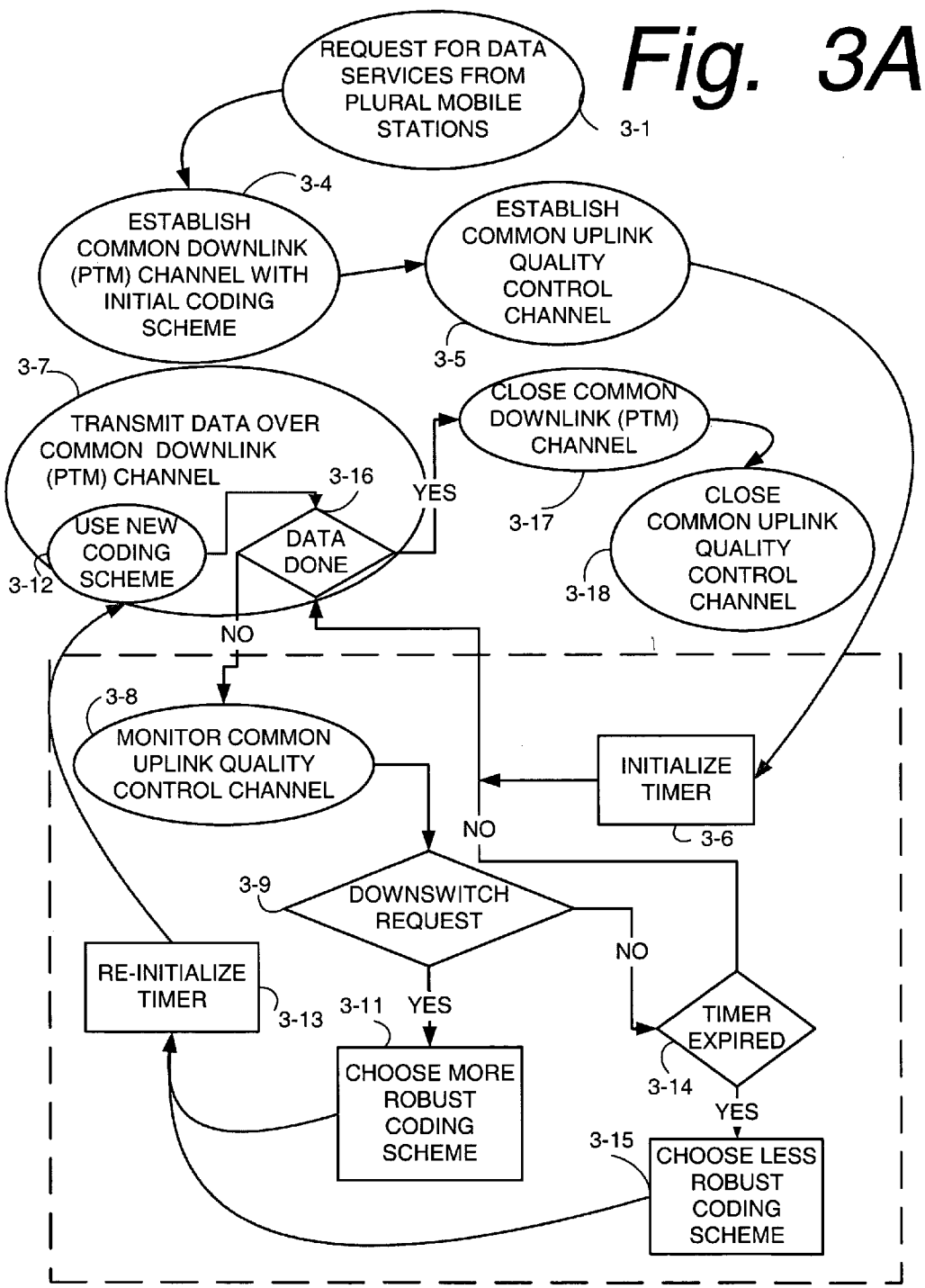

The steps of the mode of operation of the link quality monitoring procedure illustrated in FIG. 3A are generally the same as those of the mode of FIG. 3 (and accordingly are similarly numbered), with the addition of step 3-6, step 3-13 and steps 3-14 through 3-15. Step 3-6, performed prior to the monitoring process of step 3-8, involves initializing a timer. The timer essentially keeps track of the length of time for which no complaint or downswitch request is received from a mobile station on common uplink channel 36 regarding the link quality of common downlink channel 32. The no-complaint timer, initialized at step 3-6, runs from initialization until it is re-initialized (as at step 3-13, in conjunction with choosing a more robust coding scheme) or until the timer expires.

Steps 3-14 and 3-15 of the FIG. 3A mode of operation are performed when the (periodic) check at step 3-9 for a downswitch request is negative. If the check at step 3-9 for a downswitch request is negative, at step 3-14 a further inquiry is made whether the no-complaint timer has expired. If the no-complaint timer has not expired, the monitoring process (step 3-8) continues, with periodic checks being made (at step 3-16) to determine whether all data for the point-to-multipoint transmission has been completed. If, on the other hand, it is determined at step 3-14 that the no-complaint timer has expired, step 3-15 and step 3-13 are performed. In particular, the lack of complaint from any mobile station over the elapsed time period clocked by the no-complaint timer induces the network node controller 48 to choose a less robust coding scheme (step 3-15). Upon choosing of the less robust coding scheme, the network node controller 48 directs the radio link control (RLC)/medium access control (MAC) functional unit 44 which is performing the transmit process (step 3-7) to require the physical layer (layer 1) to start using the new (less robust) coding scheme for the point-to-multipoint transmission (step 3-12). Upon implementing the less robust coding scheme, the no-complaint timer is also re-initialized at step 3-13.

If it turns out that the less robust coding scheme results in a complaint or downswitch request from one (or a predetermined number) of the mobile stations, then a mode such as that depicted in FIG. 3 and FIG. 3A may be implemented in order to return to a more robust coding scheme. In such case, a time delay or other protection feature may be required to prevent a ping-pong effect between coding schemes, so that a sufficient time elapses or other event occurs before the network node controller 48 again attempts to implement a less robust coding scheme. This functionality is depicted in FIG. 3A.

Figure 3B:
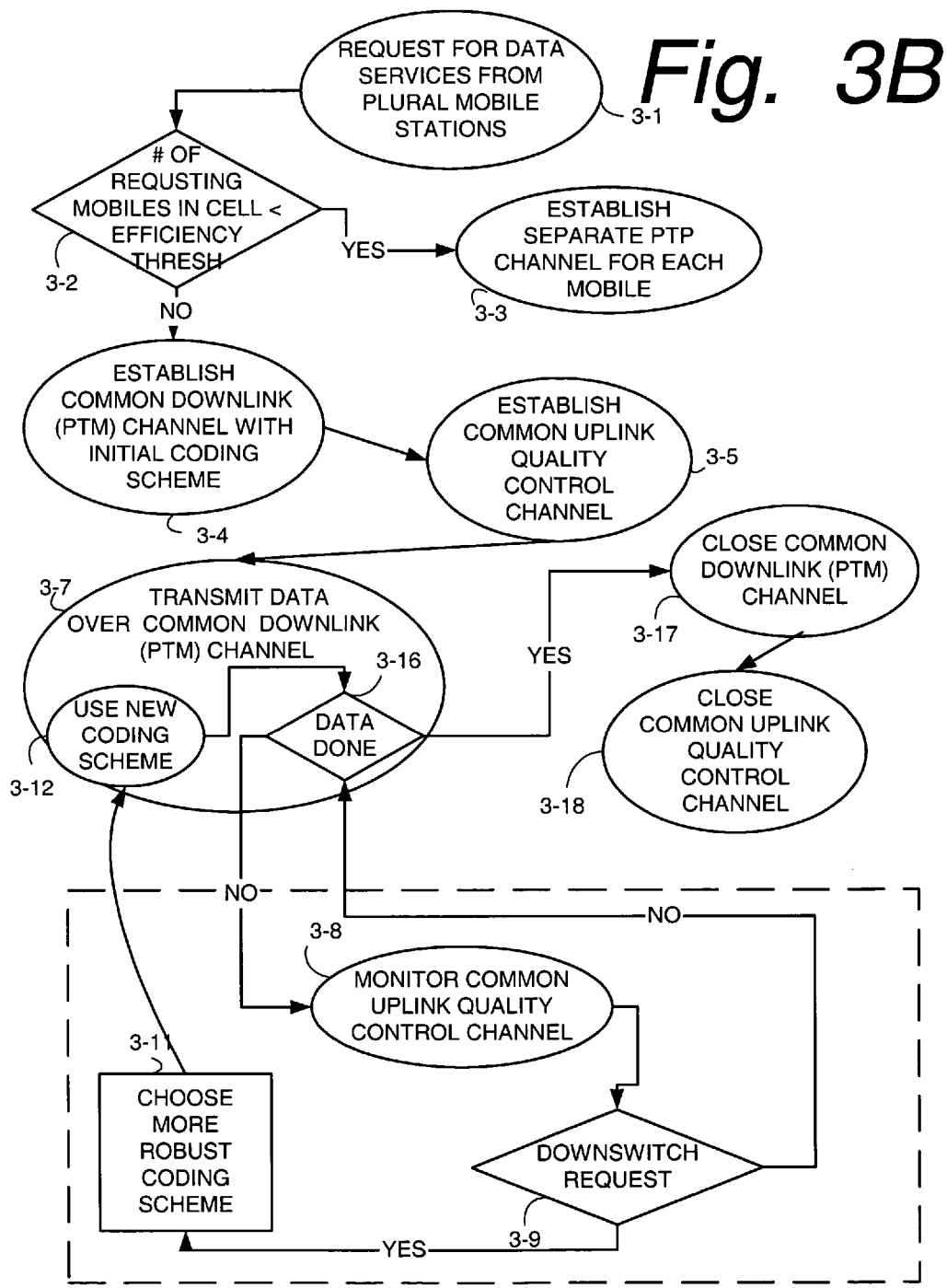

In another mode of operation, illustrated by way of example with reference to FIG. 3B, the controller 48 of the network node 28 counts the number of mobile stations requesting participation in a point-to-multipoint transmission in order first to determine whether it is more efficient to set up a point-to-multipoint transmission on a common downlink channel such as common downlink channel 32, or instead to set up individual downlink channels (e.g., point-to-point (PTP) channels) to each mobile station requesting the service that otherwise would be conveyed in the point-to-multipoint transmission. The steps of the mode of operation of FIG. 3B are generally the same as those of the mode of FIG. 3 (and accordingly are similarly numbered), with the addition of step 3-2 and step 3-4.

As step 3-2, which follows step 3-1, the network node 28 determines the number of mobile stations requesting the data that could be carried in a point-to-multipoint transmission, and then determines whether the number of requesting mobile stations in the cell is less than a predetermined efficiency threshold. Determination of the number of mobile stations can be performed in various ways, such as that described in Stage 2 of UTRAN MBMS: 3 GPP TS 25.346 Introduction of Multimedia Broadcast/Multicast Service (MBMS) in the Radio Access Network (RAN). If it is determined at step 3-2 that the number of requesting mobile stations in the cell is less than a predetermined efficiency threshold, then as step 3-3 the network node 28 establishes a point-to-point (PTP) channel for each mobile station. While establishment of the point-to-point (PTP) channel for each mobile station uses more bandwidth (because of the several channels involved), the bit rate can be individually adjusted for each mobile station depending on the respective radio link quality. Otherwise, if the number of requesting mobile stations is sufficiently high to warrant a point-to-multipoint transmission and thereby save spectral bandwidth, the point-to-multipoint transmission is setup and performed (along with the link quality monitoring procedure) as previously described by way of example with respect to FIG. 3.

As a variation of the mode of FIG. 3B, monitoring or enumeration of the number of mobile stations participating in the point-to-multipoint transmission can be performed throughout the transmission process depicted by step 3-7. In such case, steps such as step 3-2 can be performed as an on-going part of the transmit process of step 3-7. If it is then determined during the transmission procedure of step 3-7 that the number of mobile stations participating in the point-to-multipoint transmission falls below the efficiency threshold, the network node 28 can terminate the point-to-multipoint transmission and instead switch the participating mobile stations from the common downlink channel 32 to separate point-to-point channels for continued reception of the data that otherwise would have been sent via the point-to-multipoint transmission.

Figure 3C:
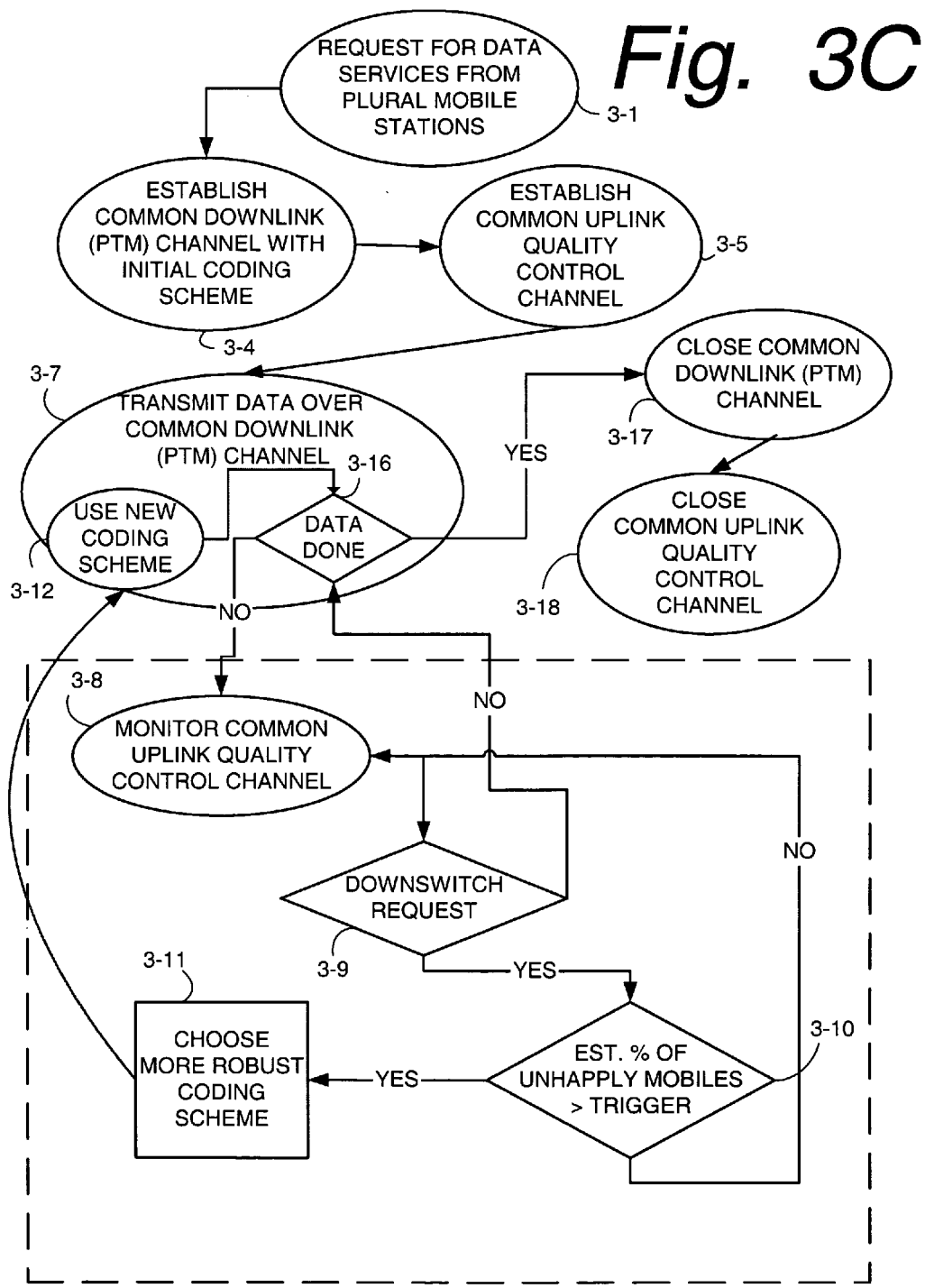
Figure 3D:
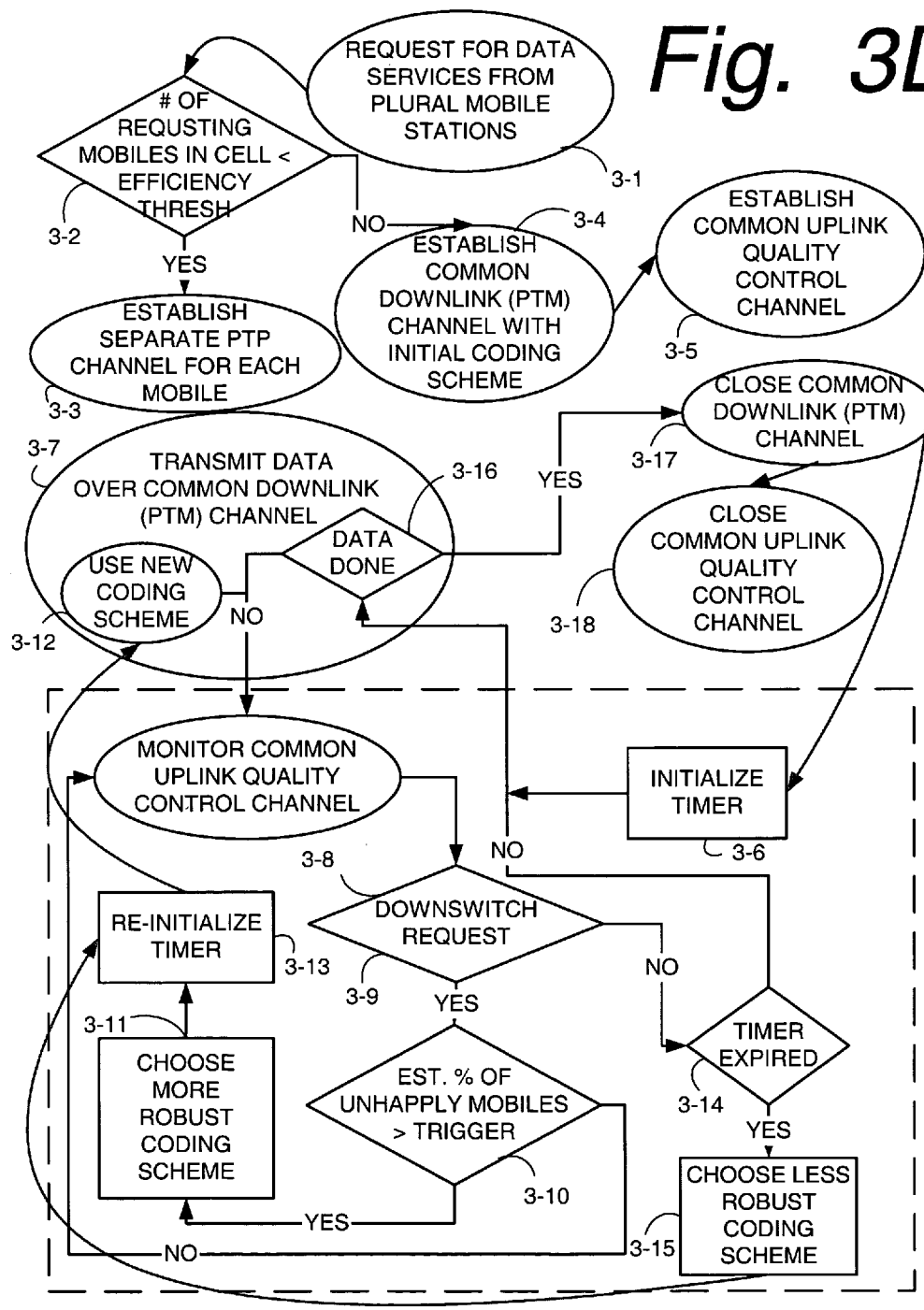

In another mode of operation, illustrated by way of example with reference to FIG. 3C, the controller 48 of the network node 28 changes the encoding from the first coding scheme to the second (more robust) coding scheme only when the feedback includes an indication that a sufficient number of the mobile stations are complaining regarding link quality. The steps of the mode of operation of the link quality monitoring procedure illustrated in FIG. 3C are generally the same as those of the mode of FIG. 3 (and accordingly are similarly numbered), with the addition of step 3-10. Step 3-10 specifically involves the controller 48 of the network node checking whether a prerequisite percentage of the mobile stations involved in the point-to-multipoint transmission on common downlink channel 32 are unhappy (e.g., are complaining by sending, e.g., a downswitch request). If it is determined at step 3-10 that a prerequisite percentage (or estimated prerequisite percentage) of the mobile stations involved in the point-to-multipoint transmission on common downlink channel 32 are unhappy, then step 3-11 is performed for using a more robust coding scheme. But if there are no unhappy mobile stations, or if the percentage of unhappy mobiles is less than a requisite trigger percentage, no change is made to the coding scheme (e.g., the transmission process of step 3-7 and the monitoring process of step 3-8 continue without coding scheme change). In such case, the network node 28 would deliberately determine that any unhappy but unsatisfied mobile stations would not receive enough information to be able to obtain the data (e.g., a video clip) with satisfactory sound and picture quality.

Step 3-10 of the mode of FIG. 3C thus involves a determination by network node 28 of an estimated percentage of unhappy mobile stations. The network node 28 must first know the number of mobile stations participating in the point-to-multipoint transmission on common downlink channel 32 before it can determine the estimated percentage of unhappy mobile stations. As indicated previously, the network node 28 typically knows the number of mobile stations participating in the point-to-multipoint transmission by keeping track of the number of participating mobile stations at setup of the point-to-multipoint transmission. Alternatively, or additionally should the number of participating mobile stations change, the network node 28 can determine the number of mobile stations participating in the point-to-multipoint transmission by a post-setup polling procedure.

Determining the estimated percentage of unhappy mobile stations also involves determining an estimate of the number of unhappy mobile stations. But, as mentioned above with reference to the format of a downswitch request burst 70, identities of the complaining mobile stations need not be provided in the downswitch request. Further, even if identifications of mobile stations are included in the downswitch request burst 70, more than one mobile station may transmit a burst 70 at a same or near same point in time. In such case, the network node 28 may not be able to decode the bursts. While it might be possible to decode the burst with the strongest power, other contemporaneously received burst could not be decoded. Nor would it be possible to ascertain how many bursts were transmitted at approximately the same time.

Therefore, to estimate the percentage of unhappy mobile stations the network node 28 should try to ensure that the random access bursts 70 are not transmitted at the same point in time, thus providing the network node 28 with some hope of counting the unhappy mobile stations. However, the network node 28 has no way of addressing the mobile stations individually, and hence cannot assign different points in time to different mobile stations.

In view of the foregoing, one example technique of implementing the mode of FIG. 3C is illustrated in FIG. 5. In the technique of FIG. 5, a specified number of plural time slots (e.g., time slots 72-1 through 72-10) received on the common uplink channel 36 are formed or associated together into a reporting group 80. When a mobile station 30 determines that it needs to complain about link quality of the point-to-multipoint transmission, a signal (e.g., burst 70) indicative of the complaint is made in one of the plural time slots 72-1 through 72-10 forming reporting group 80. Preferably, the particular time slot in which the mobile station is permitted to send the signal indicative of the complaint is randomly determined. The controller 48 of the network node 28 then obtains an estimate of a number of the mobile stations that are complaining regarding link quality by ascertaining how many of the plural time slots 72 in the reporting group 80 include a signal indicative of a complaint. The controller 48 of the network node 28 compares the estimate to a predetermined trigger value, and (as step 3-11) changes the encoding of the point-to-multipoint transmission from the first coding scheme to the second coding scheme when the estimate equals or exceeds the predetermined trigger value (the second coding scheme being a more robust coding scheme than the first coding scheme).

The technique of FIG. 5 thus involves the random selection of points in time (or timeslots, as the points in time are called). If there are only a few mobile stations but a large number of timeslots from which to make random selection, the likelihood that two mobile stations will select the same timeslot is rather small. In the illustrated example, up to ten different timeslots seem reasonable. By determining during how many of these ten timeslots there was a mobile transmitting a burst (e.g. during how many timeslots the network received any signal power), the network can estimate roughly how many terminals there are, at least if the number of terminals is less than ten. In the particular illustration of FIG. 5, time slots 72-2, 72-4, and 72-6 randomly carry bursts 70-2, 70-4, and 70-6, respectively, generated from three different mobile stations. Therefore, knowing the number of time slots and the total number of mobile stations involved in the point-to-multipoint transmission, the network node 28 can compute an estimated percentage (e.g., 3 time slots/8 mobiles=37.5% unhappy mobiles). As part of step 3-10 of FIG. 3C, this percentage can be compared to a predetermined trigger percentage to ascertain whether the network node 28 should chose a more robust coding scheme.

There also can be alternative ways of determining/detecting during how many of the ten timeslots there was a mobile transmitting a burst. The detection could be more sophisticated, such as (for example) searching for a training sequence, or decoding the payload part of the random access burst (the channel code may contain an error detection).

If the network node 28 wants to estimate the number of terminals even in the case when there are significantly more than ten terminals, the network node 28 may request that the mobile stations send a random access (RA) burst only with a certain probability. If this probability is set to, e.g. 10%, and there are 50 terminals in total in the cell that are interested in the point-to-multipoint transmission, then five mobiles will send RA bursts, which is a number low enough to be counted with the ten-timeslot strategy. The network node 28 does not necessarily a priori know what percentage to select, but by successively decreasing (or increasing) the percentage (10%, 1%, 0.1% . . . ) and asking for renewed sending of RA bursts (during new ten-timeslot periods), the network node 28 will eventually receive only a few RA bursts during a ten-timeslot period, and hence have a rough estimate of the number of terminals.

It will be appreciate that one or more of the above described modes of FIG. 3, FIG. 3A, FIG. 3B, and FIG. 3C, or variations thereof, may be combined. For example, FIG. 3D shows a combination of steps from the various modes.

As mentioned above, the network node controller 48 of the network node 28 can choose from plural coding schemes for encoding the point-to-multipoint transmission carried on common downlink channel 32. As examples, coding parameters for the nine EGPRS coding schemes MSC-1 through MSC-9 are shown in the Table below.

TABLE 4

Coding parameters for the EGPRS coding schemes

| Scheme | Code rate | Header Code rate | Modulation | RLC blocks per Radio Block (20 ms) | Raw Data within one Radio Block | Family | BCS | Tail payload | HCS | Data rate kb/s |
|---|---|---|---|---|---|---|---|---|---|---|
| MCS-9 | 1.0 | 0.36 | 8PSK | 2 | 2 × 592 | A | 2 × 12 | 2 × 6 | 8 | 59.2 |
| MCS-8 | 0.92 | 0.36 | | 2 | 2 × 544 | A | | | | 54.4 |
| MCS-7 | 0.76 | 0.36 | | 2 | 2 × 448 | B | | | | 44.8 |
| MCS-6 | 0.49 | ⅓ | | 1 | 592 | A | 12 | 6 | | 29.6 |
| | | | | | *48 + 544* | | | | | 27.2 |
| MCS-5 | 0.37 | ⅓ | | 1 | 448 | B | | | | 22.4 |
| MCS-4 | 1.0 | 0.53 | GMSK | 1 | 352 | C | | | | 17.6 |
| MCS-3 | 0.85 | 0.53 | | 1 | 296 | A | | | | 14.8 |
| | | | | | *48 + 248 and 296* | | | | | 13.6 |
| MCS-2 | 0.66 | 0.53 | | 1 | 224 | B | | | | 11.2 |
| MCS-1 | 0.53 | 0.53 | | 1 | 176 | C | | | | 8.8 |

NOTE:
The italic captions indicate the 6 octets of padding when retransmitting an MCS-8 block with MCS-3 or MCS-6. For MCS-3, the 6 octets of padding are sent every second block (see 3GPP TS 44.060).

It will be appreciated that the network node 28 illustrated, e.g., in FIG. 1, may be connected to external core network nodes, such as (for example) a connectionless external core network. Such external network connections may be made through a Gateway General Packet Radio Service (GPRS) Support Node (GGSN) to a Serving General Packet Radio Service (GPRS) Support Node (SGSN), the latter being tailored to provide packet-switched type services.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a network node of a wireless telecommunication network, the method comprising:
   selecting a first coding scheme for encoding of a point-to-multipoint (PTM) transmission carried to plural mobile stations on a common downlink channel;
   monitoring information received on a common uplink channel for feedback regarding link quality of the point-to-multipoint transmission carried to the plural mobile stations on the common downlink channel;
   using the feedback regarding link quality to determine whether to change from the first coding scheme to a second coding scheme for the encoding of the point-to-multipoint transmission to the plural mobile stations.

2. The method of claim 1, wherein the network node is a base station controller node.

3. The method of claim 1, wherein the feedback received on the common uplink channel from one of the plural mobile stations includes a signal indicative of a complaint regarding link quality, and wherein upon detecting the signal indicative of a complaint on the common uplink channel, choosing a more robust coding scheme as the second coding scheme.

4. The method of claim 1, further comprising changing the encoding from the first coding scheme to the second coding scheme when the feedback fails to provide any complaint regarding link quality with a predetermined time interval, the second coding scheme being a less robust coding scheme than the first coding scheme.

5. The method of claim 1, further comprising changing the encoding from the first coding scheme to the second coding scheme only when the feedback includes an indication that a sufficient number of the mobile stations are complaining regarding link quality.

6. The method of claim 5, wherein the monitoring further comprises:
   forming a reporting group from a specified number of plural time slots received on the common uplink channel, one of the plural time slots of the group being randomly associated with a mobile station which complains regarding link quality;
   obtaining an estimate of a number of the mobile stations that are complaining regarding link quality by ascertaining how many of the plural time slots in the reporting group include a signal indicative of a complaint;
   comparing the estimate to a predetermined trigger value.

7. The method of claim 6, further comprising changing from the first coding scheme to the second coding scheme when the estimate equals or exceeds the predetermined trigger value, the second coding scheme being a more robust coding scheme than the first coding scheme.

8. The method of claim 1, wherein the common uplink channel is a random access channel.

9. The method of claim 8, wherein the random access channel is a PRACH channel.

10. A network node of a wireless telecommunication network, the node comprising:
    an encoder which encodes a point-to-multipoint transmission of same data carried to plural mobile stations on a common downlink channel;
    a controller which monitors information received on a common uplink channel for feedback regarding link quality of the point-to-multipoint transmission carried to the plural mobile stations on the common downlink channel and which uses the feedback regarding link quality to determine whether to change from a first coding scheme to a second coding scheme for the encoding of the point-to-multipoint transmission to the plural mobile stations.

11. The apparatus of claim 10, wherein the network node is a base station controller node.

12. The apparatus of claim 10, wherein the feedback received on the common uplink channel from one of the plural mobile stations includes a signal indicative of a complaint regarding link quality, and wherein upon detecting the signal indicative of a complaint on the common uplink channel, the control chooses a more robust coding scheme as the second coding scheme.

13. The apparatus of claim 10, wherein the controller changes the encoding from the first coding scheme to the second coding scheme when the feedback fails to provide any complaint regarding link quality with a predetermined time interval, the second coding scheme being a less robust coding scheme than the first coding scheme.

14. The apparatus of claim 10, wherein the controller changes the encoding from the first coding scheme to the second coding scheme only when the feedback includes an indication that a sufficient number of the mobile stations are complaining regarding link quality.

15. The apparatus of claim 14, wherein the controller:
    forms a reporting group from a specified number of plural time slots received on the common uplink channel, one of the plural time slots of the group being randomly associated with a mobile station which complains regarding link quality;
    obtains an estimate of a number of the mobile stations that are complaining regarding link quality by ascertaining how many of the plural time slots in the reporting group include a signal indicative of a complaint;
    compares the estimate to a predetermined trigger value.

16. The apparatus of claim 15, wherein the controller changes the encoding from the first coding scheme to the second coding scheme when the estimate equals or exceeds the predetermined trigger value, the second coding scheme being a more robust coding scheme than the first coding scheme.

17. The apparatus of claim 10, wherein the common uplink channel is a random access channel.

18. The apparatus of claim 17, wherein the random access channel is a PRACH channel.

19. A mobile station configured to operate in wireless telecommunication network, the mobile station comprising:
    a receiver which receives from a network node an encoded point-to-multipoint transmission of same data carried on a common downlink channel;
    a requestor which monitors link quality of the point-to-multipoint transmission and which causes provision of feedback reguarding the link quality of the point-to-multipoint transmission on a common uplink channel to a network node;
    wherein the feedback provided on the common uplink channel includes a signal indicative of a complaint regarding link quality in hope that encoding of the point-to-multipoint transmission will change to a more robust coding scheme.

20. The apparatus of claim 19, wherein the requestor determines in which time slot of a reporting group of time slots a complaint regarding link quality is to be provided as the feedback.

21. The apparatus of claim 19, wherein the requestor randomly determines in which time slot of a reporting group of time slots a complaint regarding link quality is to be provided as the feedback.

22. The apparatus of claim 21, wherein the random access channel is a PRACH channel.

23. The apparatus of claim 19, wherein the common uplink channel is a random access channel.

24. A mobile station configured to operate in a wireless telecommunication network, the mobile station comprising:
   means for receiving from a network node an encoded point-to-multipoint transmission of same data carried on a common downlink channel;
   means for monitoring link quality of the point-to-multipoint transmission; and
   means for causing provision of feedback regarding the link quality of the point-to-multipoint transmission on a common uplink channel to the network node.
   wherein the feedback provided on the common uplink channel includes a signal indicative of a complaint regarding link quality in hopes that encoding of the point-to-multipoint transmission will change to a more robust coding scheme.

25. The apparatus of claim 24, wherein the controller determines in which time slot of a reporting group of time slots a complaint regarding link quality is to be provided as the feedback.

26. The apparatus of claim 24, wherein the controller randomly determines in which time slot of a reporting group of time slots a complaint regarding link quality is to be provided as the feedback.

27. The apparatus of claim 24, wherein the common uplink channel is a random access channel.

28. The apparatus of claim 27, wherein the random access channel is a PRACH channel.

* * * * *